United States Patent [19]

Julicher

[11] Patent Number: 5,722,450
[45] Date of Patent: Mar. 3, 1998

[54] TAMPER RESISTANT CONSTRUCTION FOR HYDRANT

[75] Inventor: Bradley J. Julicher, Williamsville, N.Y.

[73] Assignee: McGard, Inc., Orchard Park, N.Y.

[21] Appl. No.: 822,396

[22] Filed: Mar. 20, 1997

Related U.S. Application Data

[63] Continuation-in-part of Ser. No. 652,633, Jun. 7, 1996, Pat. No. 5,632,301.

[51] Int. Cl.[6] ............................. F16K 35/06; E03B 9/06
[52] U.S. Cl. .................... 137/296; 81/124.3; 81/125.1; 137/382.5; 137/800; 220/284; 220/725; 220/726; 251/291
[58] Field of Search .................. 81/124.3, 125, 81/125.1; 137/296, 371, 377, 381, 382, 382.5, 800; 220/284, 725, 726, 727; 251/291, 292

[56] References Cited

U.S. PATENT DOCUMENTS

| Re. 27,616 | 4/1973 | Diaz | 137/382.5 |
|---|---|---|---|
| 2,576,631 | 11/1951 | Mueller et al. | 137/13 |
| 2,762,386 | 9/1956 | Fogle | 137/296 |
| 3,070,115 | 12/1962 | Jester | 137/296 |
| 3,450,148 | 6/1969 | Mongelluzzo et al. | 137/296 |
| 3,453,897 | 7/1969 | Adinolfi | 74/89.15 |
| 3,626,961 | 12/1971 | Quinones | 137/296 |
| 3,709,249 | 1/1973 | Diaz | 137/296 |
| 3,840,041 | 10/1974 | McMurray | 137/296 |
| 3,916,939 | 11/1975 | Gillard | 137/296 |
| 3,935,877 | 2/1976 | Franceschi | 137/296 |
| 4,033,372 | 7/1977 | Bowman | 137/296 |
| 4,369,807 | 1/1983 | Camp | 137/296 |
| 4,526,193 | 7/1985 | Drach | 137/296 |
| 4,566,481 | 1/1986 | Leopold, Jr. et al. | 137/296 |
| 4,620,428 | 11/1986 | Kopesky | 70/175 |
| 4,633,896 | 1/1987 | Bainbridge et al. | 137/296 |
| 4,716,922 | 1/1988 | Camp | 137/296 |
| 4,936,336 | 6/1990 | McCauley et al. | 137/296 |
| 5,205,312 | 4/1995 | Jerman et al. | 137/296 |

FOREIGN PATENT DOCUMENTS

| 734267 | 4/1943 | Germany | 137/296 |
|---|---|---|---|

*Primary Examiner*—George L. Walton
*Attorney, Agent, or Firm*—Joseph P. Gastel

[57] ABSTRACT

A tamper resistant construction for a fire hydrant including a hydrant nut actuating body for mounting on a hydrant nut, a shroud rotatably mounted on a first end portion of the hydrant nut actuating body, a cap rotatably mounted on a second end portion of the hydrant nut actuating body, a wrench-receiving portion on the hydrant nut actuating body, a spring mounted within the hydrant nut actuating body and secured to the cap for biasing the cap over the wrench-receiving portion, and a specialized wrench for retracting the cap and engaging the wrench-receiving portion on the hydrant nut actuating body to thereby turn the hydrant nut actuating body and a hydrant nut coupled thereto. The shroud may be removably mounted on the hydrant nut actuating body to permit access to set screws which secure the hydrant nut actuating body to the hydrant nut.

33 Claims, 5 Drawing Sheets

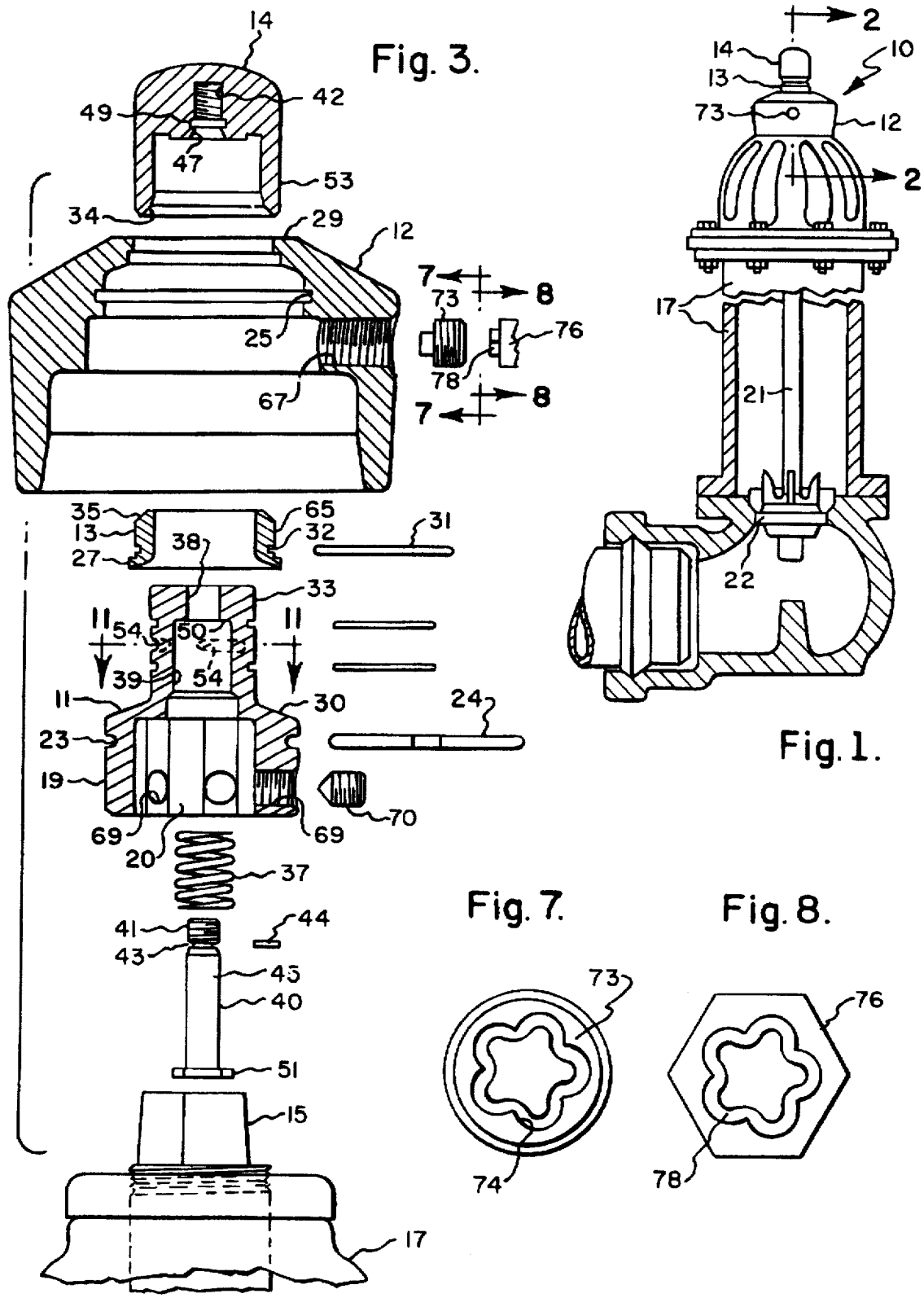

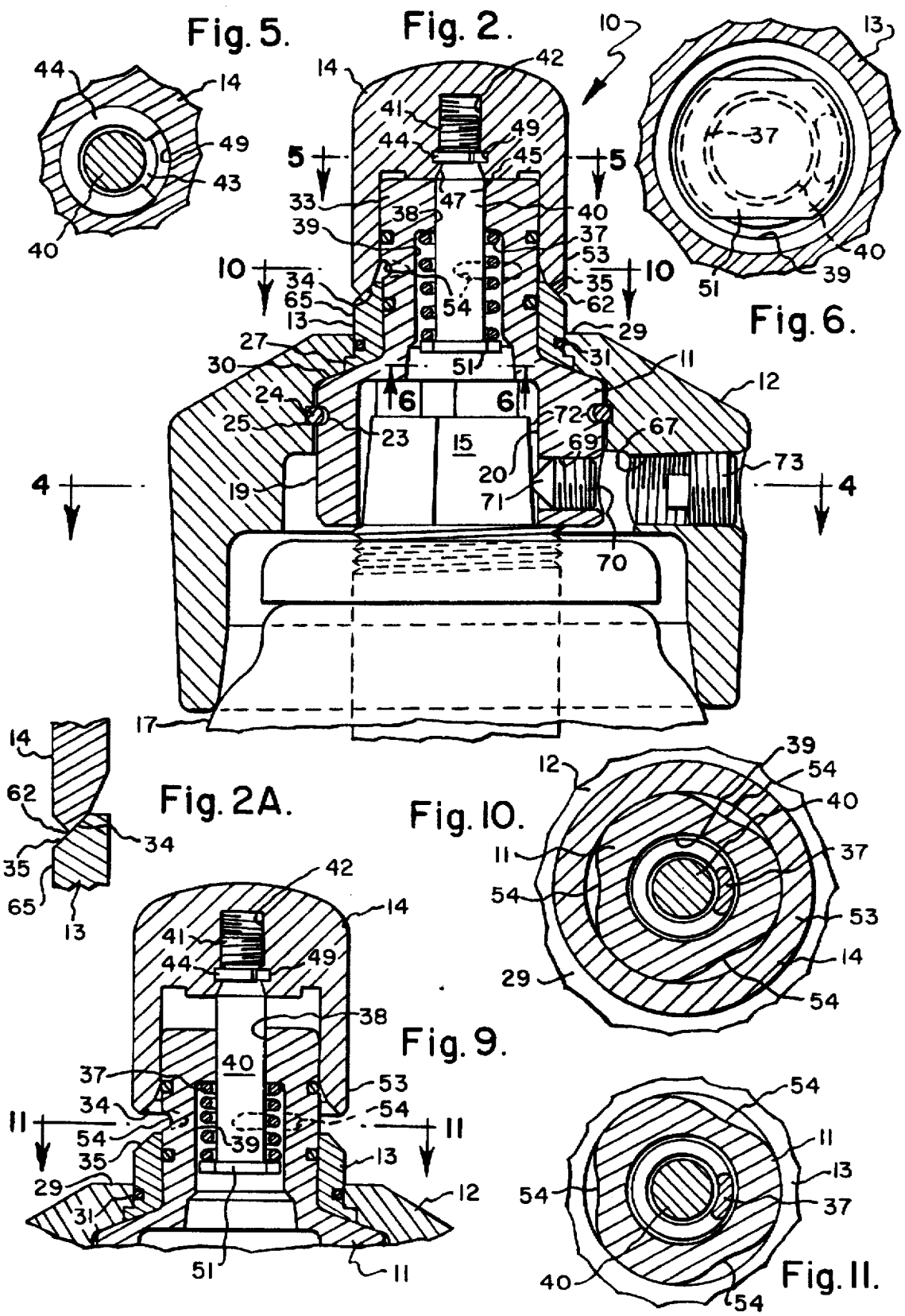

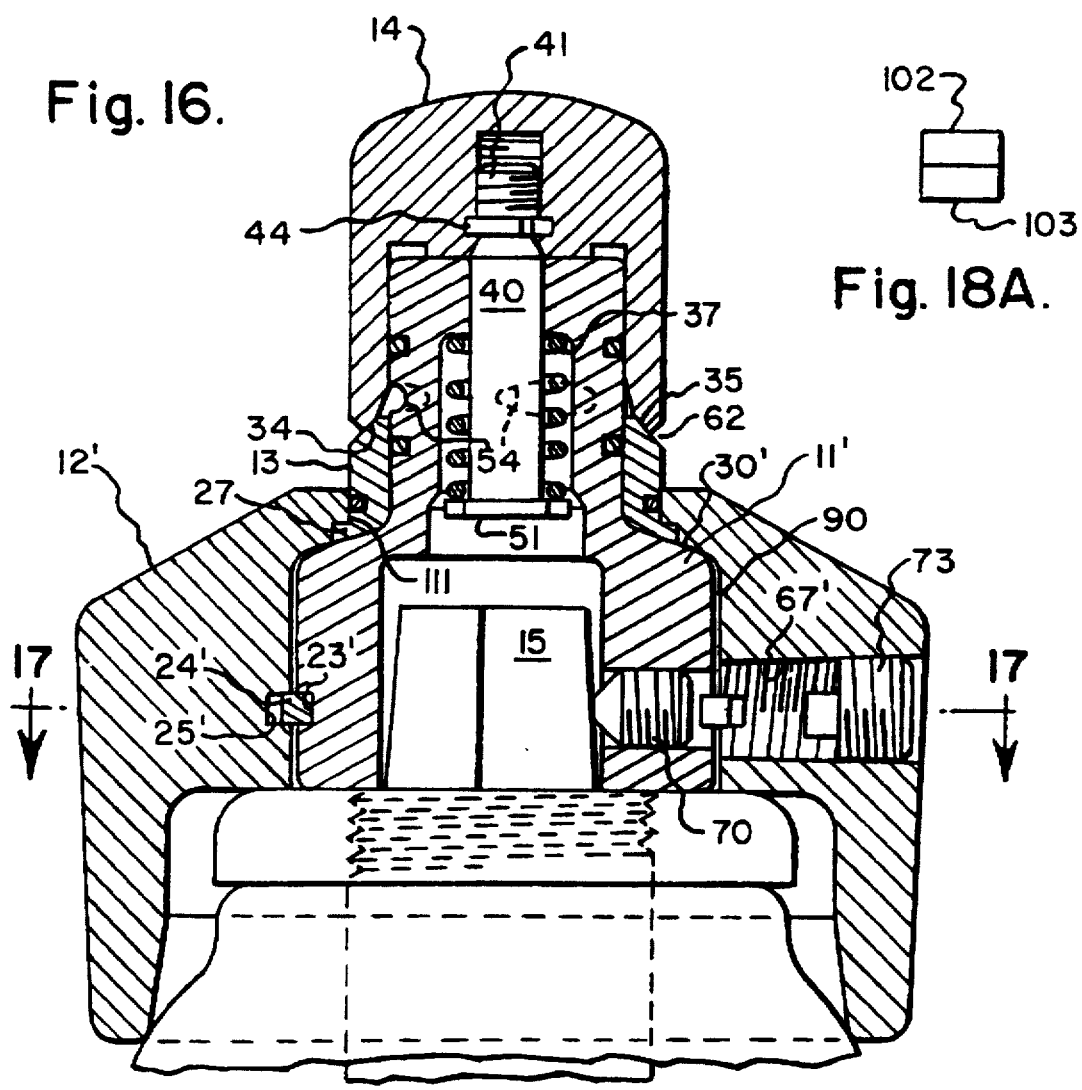
Fig. 16.
Fig. 18A.
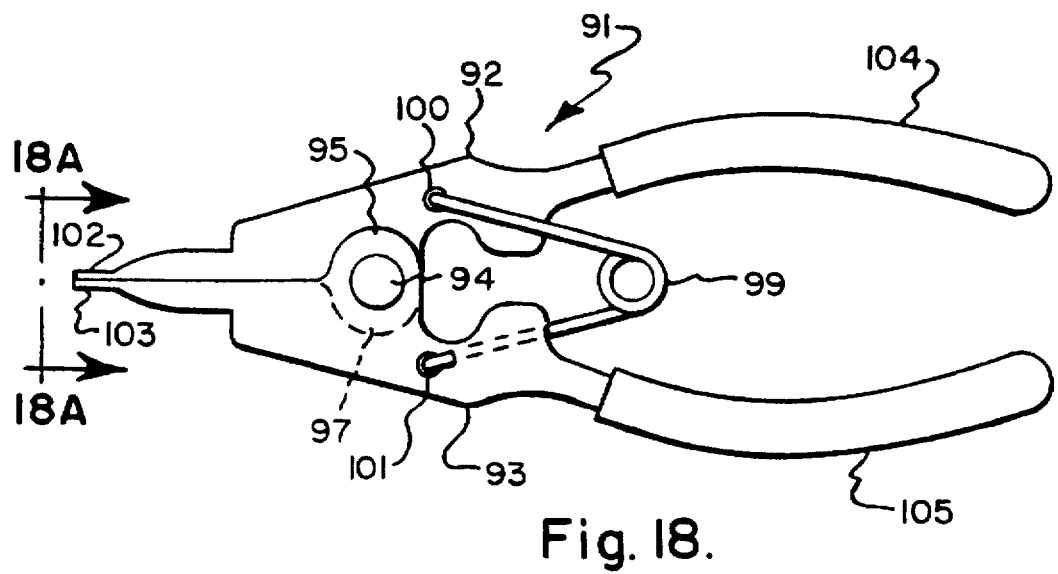
Fig. 18.

TAMPER RESISTANT CONSTRUCTION FOR HYDRANT

CROSS-REFERENCE TO RELATED APPLICATIONS

The present application is a continuation-in-part of application Ser. No. 08/652,633, filed Jun. 7, 1996, now U.S. Pat. No. 5,632,301, dated May 27, 1997.

BACKGROUND OF THE INVENTION

The present invention relates to an improved tamper resistant construction for preventing unauthorized turning of the actuating nut of a fire hydrant and it is an improvement over the construction disclosed in U.S. Pat. No. 4,936,336.

In U.S. Pat. No. 4,936,336 a rotatable shroud and a rotatable cap are mounted on a hydrant nut actuating body which is mounted in nonturning relationship on the hydrant actuating nut. The turning of the cap and shroud will not turn the hydrant nut actuating body, and thus will not turn the hydrant nut. However, a small portion of the hydrant nut actuating body is exposed between the rotatable shroud and rotatable cap to receive a special wrench for turning the hydrant nut actuating body and the hydrant nut coupled thereto. However, in the past this small exposed portion could be accessed by makeshift tools in rare instances to turn the hydrant nut actuating body. One aspect of the present invention deals with an improvement over the foregoing construction.

In addition to the foregoing, in the device of U.S. Pat. No. 4,936,336 and the device of application Ser. No. 08/652,633, filed Jun. 7, 1996, now U.S. Pat. No. 5,632,301, the shroud was permanently mounted on the hydrant nut actuating body so that it could not be removed therefrom for replacement or repair. In addition, the shroud permitted access to the set screws which mounted the hydrant nut actuating body on the hydrant nut only after the shroud was rotated to align the bore therein with each set screw individually. Another aspect of the present invention deals with an improvement over the foregoing construction.

BRIEF SUMMARY OF THE INVENTION

It is one object of the present invention to provide an improved tamper resistant construction for the nut of a fire hydrant which obscures access to any part of the tamper resistant construction which can be turned to turn the hydrant nut.

Another object of the present invention is to provide an improved tamper resistant construction for a hydrant which permits turning of the hydrant nut only by use of a specialized wrench which retracts a cap which obscures access to and establishes a turning relationship with the hydrant nut actuating body which is used to turn the hydrant actuating nut.

A further object of the present invention is to provide an improved tamper resistant construction for a hydrant wherein a rotatable shroud is removably rotatably mounted on a hydrant nut actuating body to permit its replacement and also to permit access to all of the set screws which secure the hydrant nut actuating body to the hydrant nut without requiring the alignment of a bore in the shroud with each of the set screws individually. Other objects and attendant advantages of the present invention will readily be perceived hereafter.

The present invention relates to a tamper resistant construction for a fire hydrant comprising a hydrant nut actuating body having first and second end portions, a shroud removably rotatably mounted on said first end portion of said hydrant nut actuating body, a cap rotatably mounted on said second end portion of said hydrant nut actuating body, a wrench-receiving portion on said hydrant nut actuating body, and a spring biasing said cap over said wrench-receiving portion.

In a more specific aspect, a wear ring is mounted on the hydrant nut actuating body between said shroud and said cap, and there is a lower edge on the cap in engagement with the upper edge on the wear ring. A still further aspect relates to a specialized wrench which bears on the wear ring and wedges the cap away from the wear ring and engages the wrench-receiving portion on the hydrant nut actuating body.

The present invention also relates to a tamper resistant construction for a fire hydrant comprising a hydrant nut actuating body having first and second end portions, a cap rotatably mounted on said first end portion, a shroud, and a disengageable rotatable connection between said shroud and said second end portion of said hydrant nut actuating body.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 1 is a fragmentary side elevational view, partially in cross section of the improved tamper resistant construction mounted on a fire hydrant;

FIG. 2 is a fragmentary cross sectional view taken substantially along line 2—2 of FIG. 1 and line 2—2 of FIG. 4 and showing the various parts of the tamper resistant construction in their normal positions which prevent turning of the hydrant nut;

FIG. 2A is an enlarged fragmentary cross sectional view of a portion of FIG. 2 showing the adjacent areas of the cap and the wear ring;

FIG. 3 is an exploded view, partially in cross section, showing various parts of the tamper resistant construction except the actuating wrench therefor;

FIG. 5 is a cross sectional view taken substantially along line 5—5 of FIG. 2 and showing the bolt-mounted snap ring for locking the cap to the remainder of the tamper resistant construction;

FIG. 6 is a fragmentary cross sectional view taken substantially along line 6—6 of FIG. 2 and showing the position of the head of the bolt relative to the hydrant nut actuating body;

FIG. 7 is a view taken substantially in the direction of arrows 7—7 of FIG. 3 and showing the configuration of the head of the plug which is inserted into the shroud of the tamper resistant structure;

FIG. 8 is a view taken substantially in the direction of arrows 8—8 of FIG. 3 and showing the face of the key which is used to turn the plug of FIG. 7;

FIG. 9 is an enlarged fragmentary cross sectional view similar to the upper portion of FIG. 2 but showing the position to which the cap of the tamper resistant construction is moved by the actuating wrench;

FIG. 10 is a fragmentary cross sectional view taken substantially along line 10—10 of FIG. 2 when the cap is closed and showing the configuration of the portion of the hydrant nut actuating body which receives mating portions of the actuating wrench;

FIG. 11 is a cross sectional view taken substantially along line 11—11 of FIG. 9 and further showing the relevant configuration of the portion of the hydrant nut actuating body when the cap is moved to expose the wrench-receiving portion of the hydrant nut actuating body;

FIG. 16 is a fragmentary cross sectional view similar to FIG. 2 but showing a modified embodiment of the present invention wherein the shroud is removably rotatably mounted on the hydrant nut actuating body;

FIG. 18 is a plan view of a spreader tool which is used to expand the snap ring which rotatably mounts the shroud to the hydrant nut actuating body to thereby permit removal of the shroud therefrom;

FIG. 18A is a view taken substantially in the direction of arrows 18A—18A of FIG. 18 and showing only the contour of the ends of the spreader tool;

DETAILED DESCRIPTION OF THE INVENTION

Figure 4:
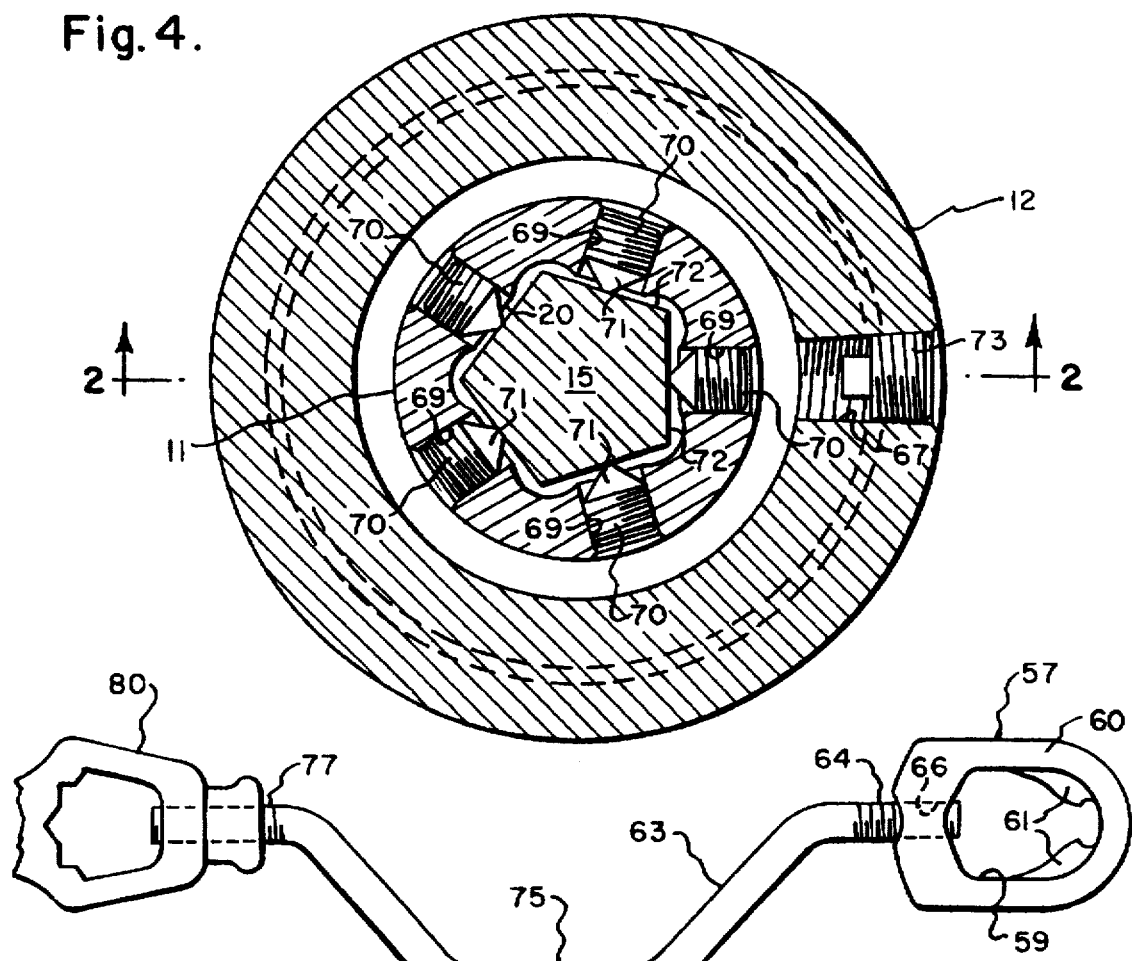
FIG. 4 is a cross sectional view taken substantially along line 4—4 of FIG. 2 and showing the structure for firmly attaching the tamper resistant construction to the hydrant nut.

The improved tamper resistant construction 10 for a hydrant 17 includes four basic parts, namely, hydrant nut actuating body 11, shroud 12, wear ring 13, and cap 14. The foregoing four parts are assembled with each other in the following described manner and are intended to be mounted on the actuating nut 15 of hydrant 17.

The hydrant nut actuating body 11 includes a lower portion 19 having a cavity 20 therein which receives hydrant actuating nut 15 which is connected to shaft 21 which in turn is connected to hydrant valve 22 (FIG. 1). A groove 23 in hydrant actuating nut body 19 receives snap ring 24 which is also received in groove 25 of shroud 12 to maintain hydrant nut actuating body 11 and shroud 12 in assembled relationship with wear ring 13 therebetween. In this respect the lower peripheral portion 27 of wear ring 13 is captured between rim 29 of shroud 12 and shoulder 30 of hydrant nut actuating body 13. An O-ring seal 31 is held in groove 32 of wear ring 13. The wear ring 13 is rotatable relative to hydrant nut actuating body 11. The above-described connection between shroud 12 and hydrant nut actuating body 11 permits free rotation of shroud 12 on hydrant nut actuating body 11.

Cap 14 is mounted on the upper portion 33 of hydrant nut actuating body in such a manner that its lower edge 34 is biased into engagement with upper beveled or tapered edge 35 of wear ring 13 by a spring 37. More specifically, spring 37 is retained in cavity 39 of hydrant nut actuating body 13 by bolt 40 which extends through bore 38. Bolt 40 has a threaded end 41 which is received in threaded bore 42 of cap 14. A groove 43 (FIG. 5) adjacent threaded end 41 receives snap ring 44 prior to the time that threaded end 41 is threaded into threaded bore 42. The spring 37 is mounted on the stem 45 of bolt 40, and when threaded end 41 is threaded into threaded bore 42, snap ring 44 will be compressed as it is forced through tapered counterbore 47 of cap 14. A point will be reached where snap ring 44 is abreast of groove 49 in cap 14, and it will then snap into groove 49 so that it will bridge groove 43 of bolt 40 and groove 49 of cap 14 to thereby retain cap 14 permanently and freely rotatably assembled on hydrant nut actuating body 11. The wear ring 13 is captured between the cap 14 and shroud 12, and all three may be rotatable as a unit on hydrant nut actuating body 14.

The resulting threading of bolt 40 into cap 14 will cause spring 37 to be compressed. In this respect the upper end of spring 37 bears against shoulder 50 of hydrant nut actuating body 11 and its lower end bears against head 51 of bolt 40. The spring 37 has a high spring rate, and in the present instance it is contemplated that it will have a spring rate of between 50 and 1,200 pounds per inch so that when it is compressed incidental to being assembled between hydrant nut actuating body 11 and cap 14, up to numerous hundreds of pounds of force could be required to be applied between lower edge 34 of cap 14 and beveled edge 35 of wear ring 13 to force cap 14 away from wear ring 13. Different spring rates may be selected to provide different levels of security as well as the difficulty of operation, as desired by the ultimate user.

In the foregoing assembly the lower edge portion 53 of cap 14 covers wrench-receiving grooves 54 (FIG. 2) in hydrant nut actuating body 11 thereby rendering such grooves covered and inaccessible without the use of a specialized wrench which is used to force cap 14 upwardly against the bias of spring 37.

The above described assembly of the hydrant nut actuating body 11, shroud 12, wear ring 13 and cap 14 are mounted on the hydrant nut 15 in substantially the same manner as set forth in U.S. Pat. No. 4,936,336 as follows. First of all, the pentagonal cavity 20 of hydrant nut actuating body 11 is oriented to receive hydrant actuating nut 15 and the hydrant nut actuating body 11 is slipped over hydrant nut 15. Thereafter, shroud 12 is rotated so that the bore 67 (FIG. 4) is in alignment with one of the bores 69 in hydrant nut actuating body 11. Thereafter, a set screw 70 is accessed through bore 67 by a suitable tool such as an Allen wrench or screwdriver and its point 71 is driven into the respective side 72 of actuating nut 15. Thereafter, shroud 12 is rotated relative to the hydrant nut actuating body 11 until bore 67 is aligned with another threaded bore 69 and another set screw 70 in a bore 69 is rotated so that its tip 71 bears into an adjacent side 72 of hydrant nut 15. This process is repeated until the remaining three set screws 70 are driven into engagement with their respective sides of hydrant nut 15. After all of the set screws have been securely driven onto hydrant nut 15, a plug 73 (FIGS. 3, 4 and 7) having a curvilinear key-receiving groove 74 therein is threaded into threaded bore 67 by the use of a suitable key 76 having a curvilinear ridge 78 thereon which mates with curvilinear groove 74. Thus, access to set screws 70 cannot be had without first removing plug 73 with the proper key.

It is also contemplated that the portion of the tamper resistant construction of the present invention, wherein the cap 14 is spring biased against the wear ring 13, can be mounted in the manner disclosed in concurrently filed application Ser. No. 08/651,294, filed on Jun. 7, 1996, now U.S. Pat. No. 5,630,422. In the copending application a modified packing nut with an internal groove therein replaces the existing packing nut of the hydrant, and the lower portion of a hydrant nut actuating body is located within the upper portion of the modified packing nut, and a plurality of circumferentially spaced studs extend outwardly from the hydrant nut actuating body and are received in the internal groove of the modified packing nut to thereby rotatably secure the hydrant nut actuating body to the packing nut.

In accordance with another aspect of the present invention, a specialized wrench 55 is provided for both uncovering wrench-receiving grooves 54 in hydrant nut actuating body, and for thereafter automatically mating with wrench-receiving grooves 54 so as to turn hydrant nut actuating body 11 and hydrant nut 15 which is received in cavity 20 thereof. More specifically, wrench 55 includes a head 57 having an opening 59 therein which receives cap 14 in the sense that the frame 60 of wrench head 57 can slip over cap 14 until lips 61 are abreast of the annular groove 62 (FIG. 2A) between the lower end of cap 14 and the upper beveled edge 35 of wear ring 13. Thereafter, the handle 63 is rotated to thread its threaded end 64 into opening 59 so that it bears against the lower portion 53 of cap 14 and the adjacent upper portion 65 of wear ring 13. Continued rotation of handle 63 will cause lips 61 to bear against beveled edge 35 of wear ring 13 and also bear against the extreme lower portion 53 of cap 14 to thereby pry cap 14 upwardly against the bias of spring 37. At this time the lips 61 of wrench head 57 will also slide upwardly along beveled edge 35 until such time as they are abreast of wrench-receiving grooves 54 at which time the lips 61 will slip into these grooves or at least be abreast of these grooves so that when the wrench head is rotated relative to the grooves 54, lips 61 will enter such grooves. At this time the wrench can be turned to turn hydrant nut actuating body 11 and the hydrant nut 15 which is nonrotatably retained in cavity 20. The relative positions of the cap 14 and wear ring 13 when the wrench head 57 is in turning position, is depicted in FIG. 9. Assuming a spring rate of 1,000 pounds per inch and assuming that the cap 14 has to be moved ¼ of an inch in order to properly position the wrench head 57 for turning the hydrant nut actuating body 11, 250 pounds of force are required for moving cap 14. It is to be especially noted that the surface 35 of wear ring 13 is sufficiently hard so that it will not be marred by the wrench. It is also to be noted that since cap 14 and shroud 12 are freely rotatably mounted on hydrant nut actuating body 11, the turning of these two parts will not in any way result in the turning of the hydrant nut actuating body 11.

Figure 12:
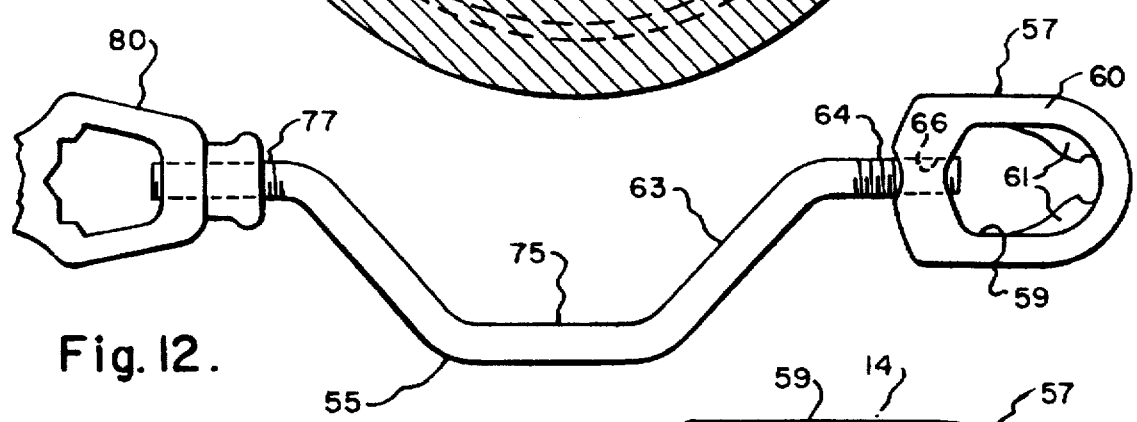
FIG. 12 is a plan view of the wrench which is utilized to move the cap of the tamper resistant construction away from its protective covering relationship to the hydrant nut actuating body and for engaging the latter to turn the hydrant nut.
Figure 15:
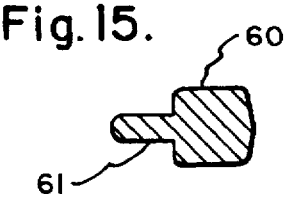
FIG. 15 is a cross sectional view taken substantially along line 15—15 of FIG. 13.
Figure 13:
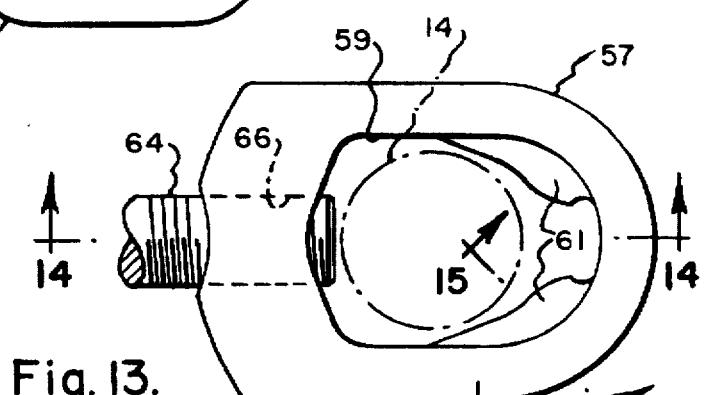
FIG. 13 is an enlarged view of the head of the hydrant nut actuating wrench.
Figure 14:
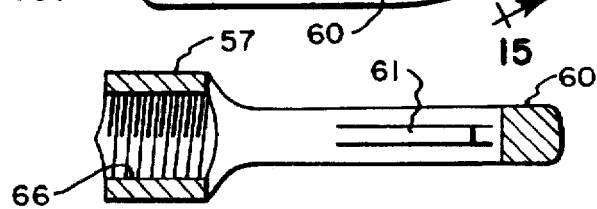
FIG. 14 is a cross sectional view taken substantially along line 14—14 of FIG. 13.

As can be seen from FIG. 12, the wrench handle 63 includes a central portion 75 which is offset from the longitudinal axis which extends through threaded portion 64 and threaded portion 77. This handle thus provides leverage for threading threaded end 64 into wrench head threaded bore 66. In other words, the handle 63 functions in the manner of a hand drill so that there is essentially a lever arm between wrench handle portion 75 and the threaded portions 64 and 77. This is required to generate the necessary force for wedging cap 14 away from wear ring 13 in the above-described manner. The threaded end 77 of handle 63 mounts a conventional universal wrench head 80 of a form which fits various types of hydrant nuts. Thus the same wrench 55 can be used for the hydrant both when the tamper resistant structure 10 is mounted thereon and when it is not.

In FIGS. 16-20 another embodiment of the present invention is disclosed wherein the shroud 12', which corresponds to shroud 12 of FIGS. 1-15, is removably rotatably mounted on hydrant nut actuating body 11', which corresponds to hydrant nut actuating body 11 of FIGS. 1-15. The removable mounting of shroud 12' from hydrant nut actuating body 11' permits replacement of shroud 12' if required, and, more importantly, permits access to set screws 70 (FIGS. 16 and 17) without requiring shroud 12' to be rotated so that its bore 67', which corresponds to bore 67 of FIG. 4, is in alignment with each set screw 70 to permit disengagement between hydrant nut actuating body 11' and hydrant nut 15.

In the embodiment of FIGS. 16-20 all portions of the embodiment above peripheral portion 27 of wear ring 13 are identical to like elements of structure described above in FIGS. 1-15. Accordingly, only certain numerals are used in FIGS. 16 and 17, and those numerals which are identical to the numerals in FIGS. 1-15, will denote identical elements of structure. The specific description of all of the structure above peripheral portion 27 in FIGS. 16-20 is not deemed necessary inasmuch as it was described relative to FIGS. 1-15.

The hydrant nut actuating body 11' of FIGS. 16-20 contains a groove 23' which receives snap ring 24' of square cross section which bridges groove 23' and groove 25' in shroud 12'. The differences between groove 23', snap ring 24' and groove 25' of FIG. 16 over groove 23, snap ring 24 and groove 25, respectively, of FIG. 2 are as follows: As can be seen from FIG. 2, snap ring 24 is of the type which is normally biased outwardly into groove 25 of shroud 12. During assembly between hydrant nut actuating body 11 and shroud 12, snap ring 24 is compressed into groove 23 in hydrant nut actuating body, in the conventional manner, by a sleeve (not shown), and shroud 12 is slipped downwardly over the lower portion of hydrant nut actuating body 11 in contact with the sleeve as the sleeve (not shown) is removed. A point will be reached where the inner portion of shroud 12 below groove 25 will replace the sleeve (not shown) to maintain snap ring 24 in groove 23, and when grooves 23 and 25 are in alignment, snap ring 24 will snap outwardly to the position shown in FIG. 2.

Figure 17:
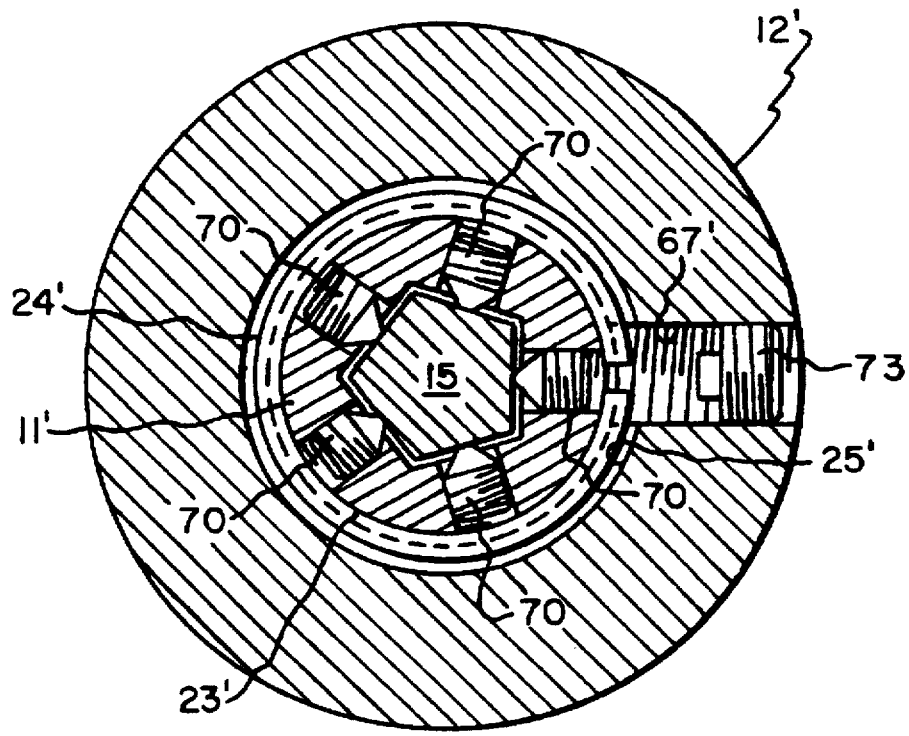
FIG. 17 is a cross sectional view taken substantially along line 17—17 of FIG. 16.
Figure 19:
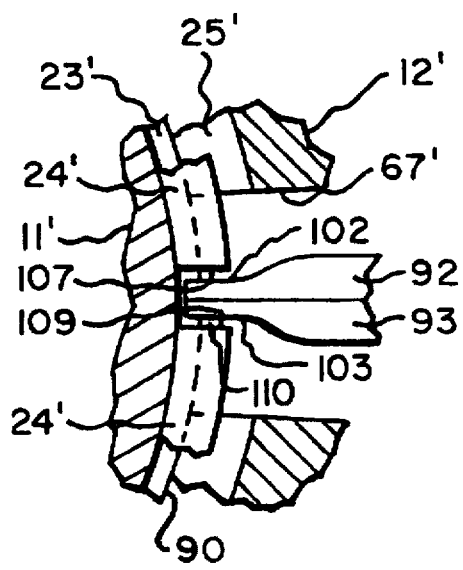
FIG. 19 is a fragmentary enlarged portion of FIG. 17 and showing in addition the tip of the spreader tool in position for expanding the snap ring.

In contrast to the foregoing structure of FIG. 2, snap ring 24' is biased inwardly into groove 23' when the parts are assembled, as shown in FIGS. 16 and 17. Prior to assembly, snap ring 24' is popped into shroud groove 25' by initially compressing it and letting it snap into groove 25' when it is aligned therewith so that it is partially in groove 25'. Thereafter, during assembly of shroud 12' onto hydrant nut actuating body 11', snap ring 24' is expanded outwardly so that it is sufficiently within groove 25' so that its inner diameter is larger than the diameter of cylindrical shroud mounting portion 90 of hydrant nut actuating body 11', as discussed in detail hereafter, so that it can pass over shoulder 30' of hydrant nut actuating body. Once it reaches cylindrical portion 90 of hydrant nut actuating body 11', it will remain in groove 25' of shroud 12' as shroud 12' is moved downwardly over cylindrical shroud mounting portion 90 until groove 23' of shroud mounting portion 90 and groove 25' of shroud 12' are abreast of each other at which time it will snap inwardly into groove 23', and in this position it will bridge grooves 23' and 25' to retain shroud 12' assembled on hydrant nut actuating body 11'. In addition to the foregoing, as can be seen from a comparison of FIGS. 2 and 16, snap ring 24' is of square cross section whereas snap ring 24 is of circular cross section.

In order to spread snap ring 24' so that it is contained within annular groove 25' of shroud 12', as described above, a spreader tool 91 (FIG. 18) is used. Tool 91 includes substantially mirror image parts 92 and 93 which are pivotally mounted to each other by pin 94 which extends through lobe 95 of part 93 and lobe 97 of part 92. Parts 92 and 93 are biased to the position shown in FIG. 18 by spring 99 which has its ends in apertures 100 and 101 in parts 92 and 93, respectively. Tips 102 and 103 of rectangular cross section are located at the ends of parts 92 and 93, respectively. When handles 104 and 105 are moved toward each other, tips 102 and 103 will move from the position shown in FIG. 19 to the position shown in FIG. 20. Thus, the tips 102 and 103 of spreader tool 91 can be inserted through bore 67' of shroud 12, when plug 73 is removed, to engage the square ends 107 and 109 of snap ring 24' to thereby expand it so that it is housed sufficiently within groove 25' to thus permit shroud 12' to be slipped downwardly over the lower portion 90 of hydrant nut actuating body 11' during the mounting of shroud 12' on hydrant nut actuating body 11'. When the ends 102 and 103 of the spreader tool are returned to the closed condition shown in FIG. 19, the previously expanded snap ring 24' will self-bias to the position shown in FIG. 19 wherein it bridges grooves 23' and 25'.

Figure 20:
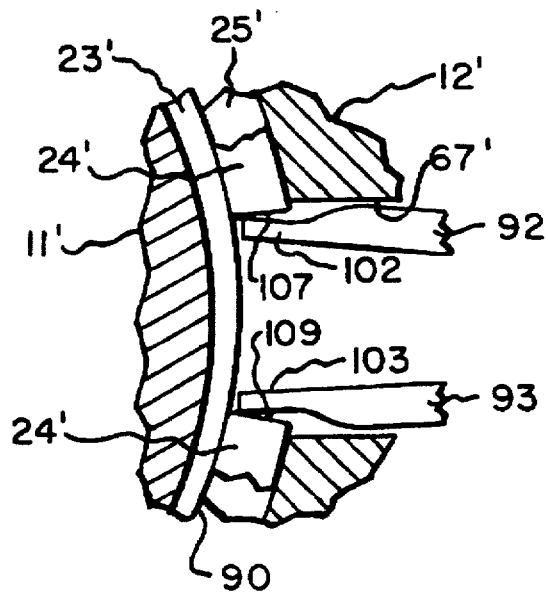
FIG. 20 is a view similar to FIG. 19 but showing the tip of the spreader tool in a position where it has expanded the snap ring.

In order to remove shroud 12' from its position shown in FIG. 16, it is merely necessary to insert the ends 102 and 103 of spreader tool 91 through bore 67' so that these ends will enter the gap 110 between snap ring ends 107 and 109, and thereafter when the handles 104 and 105 of tool 91 are caused to approach each other, the tips 102 and 103 will engage square snap ring ends 107 and 109 and spread snap ring 24' to the position shown in FIG. 20, wherein the snap ring is sufficiently located in shroud groove 25' and no longer in hydrant nut actuating body groove 23' so that shroud 12' can be lifted upwardly in FIG. 16 until snap ring 24' is at least above groove 23', and thereafter, whether the snap ring 24' remains spread or whether it contracts onto cylindrical surface 90, shroud 12' can be lifted upwardly. In the event that bore 67' is not in alignment with gap 110, shroud 12' can be rotated until it is so aligned to permit access to the gap 110 by the spreader tool 91.

It is to be noted that the annular opening 111 at the top of shroud 12' is larger than the outer circumference of wear ring 13 and it is also larger than the outer circumference of cap 14 so that shroud 12' can be lifted upwardly and outwardly beyond cap 14, and thus it can be totally removed out of assembled relationship with hydrant nut actuating body 11', wear ring 13 and cap 14. Shroud 12' can thus be replaced by another shroud, if desired.

The fact that shroud 12' can be completely removed from overlying relationship to set screws 70, permits the manipulation of set screws 70 for either installing the hydrant nut actuating body 11' onto hydrant nut 15 or removing it therefrom, without the necessity of rotating shroud 12' incrementally so that its bore 67' is in alignment with each set screw 70. In other words all set screws 70 (FIG. 17) may be uncovered simultaneously by the removal of shroud 12', to thereby permit access to the set screws without the necessity of having to do so by entering bore 67' in shroud 12' for access to each set screw, as discussed above relative to FIGS. 1–15.

As noted above, the snap ring 24' is accessed through bore 67' which corresponds to bore 67 of FIGS. 4 and 5. Plug 73 is threaded into bore 67' in order to prevent access to snap ring 24'. Plug 73 is identical to plug 73 described above relative to FIGS. 1–15, and especially FIGS. 3, 7 and 8, and therefore a detailed description of plug 73 and its associated key 76 relative to FIGS. 16 and 17 is deemed unnecessary.

In the construction of FIGS. 16–20 it is necessary to have a wear ring which is separate from the shroud 12' in order to permit shroud 12' to be assembled and disassembled relative to hydrant nut actuating body 11'. However, in the embodiment of FIGS. 1–15, the wear ring 13 may be an integral part of shroud 12 because shroud 12 is permanently mounted on hydrant nut actuating body 11.

While a preferred embodiment of the present invention has been disclosed, it will be appreciated that the present invention is not limited thereto but may be otherwise embodied within the scope of the following claims.

I claim:

1. A tamper resistant construction for a fire hydrant comprising a hydrant nut actuating body having first and second end portions, a shroud rotatably mounted on and removable from said first end portion of said hydrant nut actuating body, a cap rotatably mounted on said second end portion of said hydrant nut actuating body, a wrench-receiving portion on said hydrant nut actuating body, and a spring biasing said cap over said wrench-receiving portion.

2. A tamper resistant construction as set forth in claim 1 including a first bore in said upper portion of said hydrant nut actuating body, and wherein said spring is located within said first bore, a second bore in communication with said first bore and extending through said upper portion of said hydrant nut actuating body, a bolt extending through said spring and said second bore, a first end on said bolt received in said cap, and a second end on said bolt bearing against said spring.

3. A tamper resistant construction as set forth in claim 1 wherein said shroud is rotatably and removably mounted on said first end portion of said hydrant nut actuating body by a snap ring.

4. A tamper resistant construction as set forth in claim 3 including a gap in said snap ring, and a bore in said shroud alignable with said gap.

5. A tamper resistant construction as set forth in claim 4 including a plug for insertion into said bore.

6. A tamper resistant construction as set forth in claim 4 including a first groove in said hydrant nut actuating body, and a second groove in said shroud, and wherein said snap ring is self biased into said first groove and bridges said first and second grooves.

7. A tamper resistant construction as set forth in claim 1 including a wrench, a wrench head on said wrench, an opening in said wrench head, lips on said wrench head facing said opening for engaging said wrench receiving portion, a wrench handle, and an end on said wrench handle movable into said wrench head in effective opposition to said lips.

8. A tamper resistant construction for a fire hydrant comprising a hydrant nut actuating body having first and second end portions, a cap rotatably mounted on said first end portion, a shroud, and a disengageable rotatable connection between said shroud and said second end portion of said hydrant nut actuating body to permit removal of said shroud from said hydrant nut actuating body.

9. A tamper resistant construction as set forth in claim 8 wherein said disengageable rotatable connection comprises a snap ring.

10. A tamper resistant construction as set forth in claim 9 including a first groove in said hydrant nut actuating body, a second groove in said shroud in alignment with said first groove, and wherein said snap ring bridges said first and second grooves when said shroud is assembled on said hydrant nut actuating body.

11. A tamper resistant construction as set forth in claim 10 wherein said snap ring is self-biased into said first groove.

12. A tamper resistant construction as set forth in claim 11 including a bore in said shroud for obtaining access to said snap ring.

13. A tamper resistant construction as set forth in claim 9 including a bore in said shroud for obtaining access to said snap ring.

14. A tamper resistant construction as set forth in claim 13 including a gap in said snap ring, and wherein said bore is alignable with said gap.

15. A tamper resistant construction as set forth in claim 9 wherein said cap has a first diameter, and an opening in said shroud which encircles said hydrant nut actuating body, said opening having a second diameter which is larger than said first diameter for permitting said shroud to pass over said cap after it has been disengaged from said hydrant nut actuating body.

16. A tamper resistant construction as set forth in claim 8 including a plurality of circumferentially spaced threaded bores in said second end portion of said hydrant nut actuating body, and a plurality of set screws in said plurality of threaded bores.

17. A tamper resistant construction as set forth in claim 16 wherein said disengageable rotatable connection comprises a snap ring which permits axial movement of said shroud relative to said hydrant nut actuating body to obtain access to said plurality of set screws.

18. A tamper resistant construction as set forth in claim 17 wherein said cap has a first diameter, and an opening in said shroud which encircles said hydrant nut actuating body, said opening having a second diameter which is larger than said first diameter for permitting said shroud to pass over said cap after it has been disengaged from said hydrant nut actuating body.

19. A tamper resistant construction for a fire hydrant comprising a hydrant nut actuating body having first and second end portions, a shroud rotatably mounted on and removable from said first end portion of said hydrant nut actuating body, a cap rotatably mounted on said second end portion of said hydrant nut actuating body, and a wrench-receiving portion on said hydrant nut actuating body.

20. A tamper resistant construction as set forth in claim 19 wherein said shroud is rotatably and removably mounted on said first end portion of said hydrant nut actuating body by a snap ring.

21. A tamper resistant construction as set forth in claim 20 including a gap in said snap ring, and a bore in said shroud alignable with said gap.

22. A tamper resistant construction as set forth in claim 21 including a plug for insertion into said bore.

23. A tamper resistant construction as set forth in claim 21 including a first groove in said hydrant nut actuating body, and a second groove in said shroud, and wherein said snap ring is self biased into said first groove and bridges said first and second grooves.

24. A tamper resistant construction as set forth in claim 19 including a wrench, a wrench head on said wrench, an opening in said wrench head, lips on said wrench head facing said opening for engaging said wrench receiving portion, a wrench handle, and an end on said wrench handle movable into said wrench head in effective opposition to said lips.

25. A tamper resistant construction for a fire hydrant comprising a hydrant nut actuating body having a shroud mounting portion, a shroud, and a disengageable rotatable connection between said shroud and said shroud mounting portion of said hydrant nut actuating body.

26. A tamper resistant construction as set forth in claim 25 wherein said disengageable rotatable connection comprises a snap ring.

27. A tamper resistant construction as set forth in claim 26 including a first groove in said hydrant nut actuating body, a second groove in said shroud in alignment with said first groove, and wherein said snap ring bridges said first and second grooves when said shroud is assembled on said hydrant nut actuating body.

28. A tamper resistant construction as set forth in claim 26 including a bore in said shroud for obtaining access to said snap ring.

29. A tamper resistant construction as set forth in claim 28 including a gap in said snap ring, and wherein said bore is alignable with said gap.

30. A tamper resistant construction as set forth in claim 27 wherein said snap ring is self-biased into said first groove.

31. A tamper resistant construction as set forth in claim 30 including a bore in said shroud for obtaining access to said snap ring.

32. A tamper resistant construction as set forth in claim 25 including a plurality of circumferentially spaced threaded bores in said hydrant nut actuating body, and a plurality of set screws in said plurality of threaded bores.

33. A tamper resistant construction as set forth in claim 32 wherein said disengageable rotatable connection comprises a snap ring which permits axial movement of said shroud relative to said hydrant nut actuating body to obtain access to said plurality of set screws.

* * * * *